Figure 1:
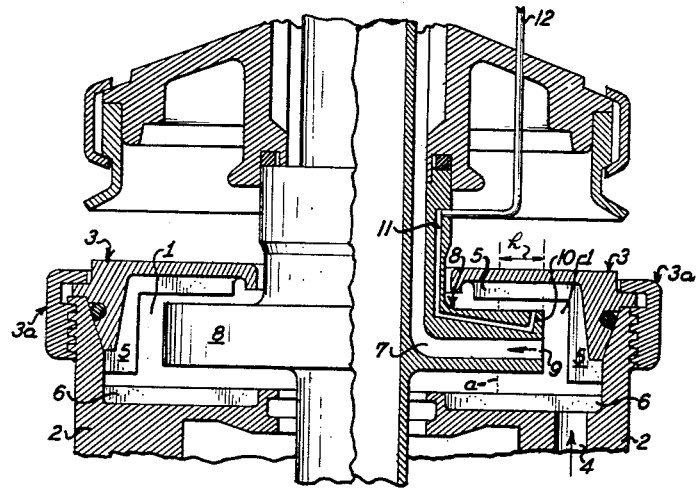

June 2, 1964

H. HEMFORT, JR 3,135,691

APPARATUS FOR ACHIEVING THE FOAM-FREE DELIVERY OF LIQUID
MATERIAL FROM A CENTRIFUGE DRUM

Filed Aug. 29, 1960

INVENTOR

HEINZ HEMFORT JR.

BY Burgess Dinklage Sprung

ATTORNEYS 3,135,691
APPARATUS FOR ACHIEVING THE FOAM-FREE DELIVERY OF LIQUID MATERIAL FROM A CENTRIFUGE DRUM
Heinz Hemfort, Jr., Oelde, Westphalia, Germany, assignor to Westfalia Separator AG., Westphalia, Germany, a corporation of Germany
Filed Aug. 29, 1960, Ser. No. 52,668
Claims priority, application Germany Sept. 24, 1959
3 Claims. (Cl. 233—19)

The present invention relates to centrifugal separators wherein a liquid material or the components thereof are withdrawn under pressure by means of stationary peeling discs from the peeling chamber of the rotating centrifugal drum, and more particularly to a liquid pressure communicating flow conduit in the peeling disc of the centrifugal arrangement for operative coupling with an adjustable pressure responsive valve means to adjust the counter-pressure of the valve means which must be overcome to actuate the valve means. The liquid pressure involved in this connection includes the hydrodynamic pressure of the rotating liquid in the peeling chamber as well as the centrifugal pressure, i.e., hydrostatic pressure of the liquid column acting upon the entrance openings of the outlet peeling channels in the peeling disc through which the liquid is passed in order to be withdrawn from the rotating drum.

It is well known that for effecting the foam-free delivery of a liquid from a centrifugal drum, a specific minimum immersion depth of the peeling disc is required. This is true since the penetration of air passing from the periphery of the peeling disc into the outlet peeling channels passing therethrough may only be prevented in this manner. Where the periphery of the peeling disc is not immersed within the liquid level, air will be taken into the outlet peeling channels from the peeling chamber which during passage through the peeling disc will generate foam and bubbles decreasing the efficiency of the desired separation.

It is well known that where a constant feed of liquid material is provided in a centrifugal arrangement, the level of the treated liquid surface in the peeling chamber is dependent upon the counter-pressure in the outlet line or outlet peeling channel. Thus, by means of a throttle device, such as a pressure responsive valve, conveniently disposed in the delivery line or outlet channel, the liquid level in the peeling chamber may be suitably displaced in dependence upon the throttle opening or valve opening in the outlet line. In this manner the necessary immersion depth of the peeling disc within the peeling chamber may be suitably adjusted for the foam-free withdrawal of the liquid from the peeling chamber inasmuch as an increase in the counter-pressure of the delivery or outlet line from the drum will affect a displacement of the liquid level in the peeling chamber in a direction toward the drum axis while a decrease in the counter-pressure will cause a displacement in a direction radially outwardly of the drum axis. The counter-pressure may be suitably adjusted by increasing or decreasing the throttle opening such as by providing in the delivery or outlet line from the peeling disc a suitable pressure responsive valve.

Despite adjustments as above described for the foam-free delivery of liquids from the peeling chamber of a centrifugal drum, if the flow resistance of a subsequently connected device is altered, then the liquid level in the peeling chamber is automatically displaced due to the counter-pressure caused by the change in flow resistance in the delivery or outlet line used for withdrawing the liquid passing through the peeling disc. In this connection, as the flow resistance is changed, so also is the centrifugal pressure of the liquid on the entrance openings of the peeling channels. This displacement effects an adjustment of the delivery pressure to the changed counter-pressure. Thus, the constant output of a peeling disc is influenced by changes in the counter-pressure of the delivery or outlet line through which the peeled off liquids are withdrawn. This, however, is valid only insofar as a fluctuating adjustment of the liquid surface or level in the peeling chamber with respect to the changes in counter-pressure in the delivery or outlet line is possible. On the one hand, starting with a certain pressure an increase in counter-pressure is limited in one direction since the liquid level will become increasingly displaced radially inwardly until the same overflows the peeling chamber. On the other hand, where the liquid level is displaced radially outwardly due to the decrease in counter-pressure, such level will fall below the immersion depth of the peeling disc necessary for the foam-free delivery and instead air will be taken into the peeling disc with undesired generation of foam and bubbles. Where a constant output is involved in connection with a delivery or outlet line of constant cross-section, a constant flow rate will be present which will effect a constant pressure decrease throughout the delivery or outlet line. Thus, where a constant capacity is contemplated, the pressure decrease in the peeling channels will also be constant. The incorporation of a pressure meter within the delivery or output channel ahead of the throttle device or valve will not necessarily afford an accurate measure, i.e., equal pressure decreases for all ranges of immersion depth of the peeling disc. However, because the pressure meter measurement will be constant, it will aid the operator in estimating the immersion depth of the peeling disc, and the scale of the pressure meter may even be calibrated to reflect the immersion depth for a specific throughput capacity.

Nevertheless, where the feed and output vary the attendant conditions will also vary. For example, an increase in the throughput quantity will effect a displacement of the liquid level in the peeling chamber in a direction toward the axis thereof and accordingly reflect a higher pressure on the delivery lines whereby increased pressure will be required to force the increase in material through the lines of constant cross section. A greater flow rate will result and at full capacity all flow cross sections in the pressure sensitive devices and flow lines will reflect a corresponding counter-pressure increase. In this regard, the pressure decrease in the peeling channels will accordingly change with the counter-pressure but this pressure decrease will only be proportional with respect to the pressure meter reading.

The influencing conditions become completely unpredictable where, in addition to changes in throughput capacity, the counter-pressure in the delivery or outlet line is subject to change independently of the throughput. The pressure meter reading in this case is no longer reliable as it will not indicate a clear measure of the pressure acting upon the peeling channels. Consequently, the automatic control of the immersion depth of the peeling disc in order to attain a foam-free delivery of the liquid material in the centrifuge may not be carried out in dependence upon and in response to pressure meter readings obtained in the aforementioned manner.

It is an object of the present invention to overcome the drawbacks heretofore encountered and to provide for the foam-free delivery of liquid material from the centrifuge by efficiently determining the pressure of the liquid in the peeling chamber and adjusting the flow rate in consequence thereof.

Figure 2:
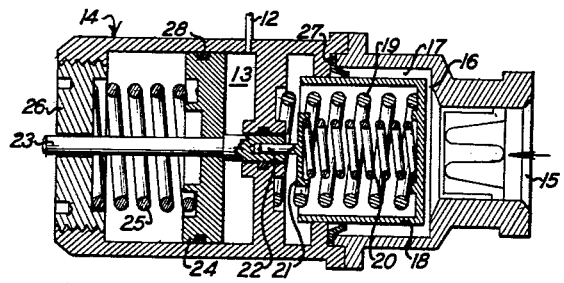

Other and further objects of the invention will become apparent from a study of the within specification and accompanying drawings in which, FIG. 1 is a partial schematic view in section indicating the upper portion of a centrifuge apparatus having a stationary peeling disc disposed in the peeling chamber of the centrifuge in accordance with one embodiment of the invention, and FIG. 2 is a sectional view of a valve in the delivery line of the centrifuge used for adjusting the rate of delivery of the liquid material passing through the peeling disc for the foam-free delivery of the liquid material in accordance with the invention.

In accordance with the present invention, it has been found that the immersion depth of the peeling disc in the liquid material maintained in the peeling chamber of a centrifuge may be maintained constant whereby the foam-free delivery of the centrifuged liquid may be effected. In accordance with the invention, the centrifugal pressure, i.e., hydrostatic pressure of the liquid material covering the peeling disc in the peeling chamber is used to control the counter-pressure in the delivery or outlet lines such that with an increase in immersion depth, the counter-pressure is correspondingly decreased, and with the decrease in immersion depth the corresponding counter-pressure is increased. In this manner, all displacements of the level of the liquid material in the peeling chamber which may occur for any reason whatsoever, are fully compensated for by an adjustment of the delivery line counter-pressure. This may be effected by means of a throttle device or valve in the delivery line.

To achieve the efficient operation of a centrifugal separation for treatment automatically without the generation of foam, in accordance with the invention, the centrifugal pressure of the liquid level covering the peeling disc is scanned, sensed, and determined and the control of the throttle device or valve in the delivery or outlet line is effected in dependence thereupon. Thus, the radial distance of the liquid level with respect to the axis of the centrifuge will determine the hydrostatic pressure of the liquid material passing through the peeling disc and therefore by measuring this pressure the desired liquid level range may be maintained.

The essential feature of the present invention will be carried out efficiently by means of a conduit defined in the peeling disc which is connected either directly or indirectly with a pressure chamber of the throttle device or valve in the delivery or outlet line. This conduit efficiently permits the scanning of the liquid level with respect to the peeling disc and the adjustment of the counter-pressure in the delivery or outlet line in consequence thereof. The scanning conduit may be defined on the underside or the upper side of the peeling disc and is preferably located in flow communication with the peeling chamber at the peripheral portion of the peeling disc.

The valve or throttle device in the delivery line is constructed such that an increase in pressure in the pressure chamber thereof in response to the change of the liquid level in the peeling chamber will effect an increase in the flow cross section through the valve for passage of liquid material passing from the peeling disc. It will be understood that a decrease in pressure in the pressure chamber of the valve caused by a change in the liquid level in the peeling chamber will corrrespondingly decrease the cross section for the liquid material passing through the peeling disc. Specifically, a displacement of the liquid level toward the axis of the centrifuge will be counteracted by a decrease in the counter-pressure of the valve while, on the other hand a displacement of the liquid level in a peripheral direction will be counteracted by an increase in the counter pressure of the delivery line. In this manner the immersion depth of the peeling disc will be adjustably maintained within the desired range of liquid levels within the peeling chamber. As a result, the foam-free delivery of liquid material treated in a centrifuge may be carried out even with relatively large pressure and throughput variations.

Referring to the drawing, FIG. 1 shows the upper portion of a centrifuge arrangement, including the drum upper part 2, the peeling chamber cover 3, and the retaining ring 3a. Within the drum upper part 2 and the peeling chamber cover 3, the peeling chamber 1 is defined into which the liquid material being treated is supplied from the main drum chamber through channel 4 in the direction of the arrow. This liquid material is maintained in rotation throughout peeling chamber 1 by means of the radial ribs 5 and 6 extending around the circumference of peeling chamber 1. Since the drum upper part 2 and peeling chamber cover 3 are rotated with the drum, ribs 5 and 6 attached thereto, also rotate causing the liquid entering from channel 4 to be impelled in circular direction. The liquid material in chamber 1 is maintained at the level $a$. The peeling off of the liquid from the peeling chamber is effected by means of the stationary peeling disc 8. The liquid is carried off by means of peeling channels 7 preferably spirally arranged around peeling disc 8 and opening into chamber 1 at the periphery of the peeling disc 8, at openings 9. The operation of a stationary peeling disc in a peeling chamber of a centrifuge up to this point is well known and is carried out in accordance with conventional procedures.

The pressure acting upon the openings 9 of peeling channels 7 is made up of the hydrodynamic pressure of the rotating liquid material as well as the centrifugal hydrostatic pressure of the liquid column $h$ which corresponds to the immersion depth of the peeling disc 8 in the liquid material. In the portion of peeling disc 8 covered by the liquid material, a scanning channel 10 is provided in order to achieve foam-free delivery of the liquid material in accordance with the invention. Scanning channel 10 opens into chamber 1 preferably at the peripheral portion of peeling disc 8, either at the upper side or the under side thereof. In FIG. 1, scanning channel 10 opens into the upper surface of peeling disc 8. The opening of scanning channel 10 is acted upon by the centrifugal hydrostatic pressure of the liquid column $h$ extending radially inwardly toward the axis of the centrifuge. Channel 10 is conveniently positioned near the edge of peeling disc 8 and is maintained in flow connection with channel 11 to which is connected a flow line 12 whereby to form a liquid pressure communicating flow conduit.

With respect to FIG. 2, flow line 12 leads to a pressure chamber or cylinder chamber 13 of an adjustable pressure responsive valve means or throttle valve 14 placed in the delivery or outlet line of the liquid material treated in the centrifuge and removed therefrom by means of peeling disc 8. The treated liquid leaving the centrifuge via the peeling channels 7 passes by an outlet line (not shown) into the throttle valve 14 at 15 and passes through the annular opening 16 into the annular chamber 17 and subsequently out of the valve 14 through an appropriate carry-off line (not shown). A control piston or closure member 18 is axially moveable within the valve 14 such that its axial position determines the flow cross sectional area of opening 16 for the liquid entering at 15. Spring 19 urges piston 18 toward the closed position, together with the auxiliary spring 20. Auxiliary spring 20 is mounted at its end remote from piston 18 on a seat 21 having a stud 22 received within a bore hole of the axially displaceable spindle 23 whereby the spring 20 is maintained in the desired central position. While seat 21 abuts the forward end of spindle 23, the intermediate end of spindle 23 is mounted on an auxiliary piston or working surface 24 against which the spring 25 is urged. Spring 25 urges spindle 23 which, in turn, urges spring 20 so as normally to exert a predetermined counter pressure in the valve 14 against the incoming liquid material at 15. In the same way, spring 19 also urges piston 18 against the inflowing liquid material. The tension of springs 25 and 20 may be suitably adjusted as desired by rotation of end plug 26 through which spindle 23 is slidably passed. Thus, while spring 19 maintains a constant pressure against piston 18, the pressure of spring 25 and spring 20 may be adjusted by turning threaded end plug 26 so as to axially move the same due to its threaded connection with the adjacent end portion of valve 14. Annular packing 27 and packing ring 28 maintain the slidable parts of the valve in desired sealed condition.

In operation, the hydrostatic pressure $h$ prevailing at the opening of scanning channel 10 in the peeling chamber 1 is effectively conducted to pressure chamber 13 of valve 14 so as to effect a displacement of auxiliary piston 24 from its base position against the action of spring 25. The movement of piston 24 to the left as viewed in the drawing (see FIG. 2) causes the axial displacement of spindle 23 whereby auxiliary spring 20 is relieved of pressure upon piston 18. Due to the reduced pressure acting against piston 18, the incoming liquid material at 15 causes piston 18 to be raised from its seat and moved in axial direction toward the left as viewed in FIG. 2. The liquid material thereby readily flows through the annular opening 16 and enters the annular chamber 17 to which is flow connected the subsequent delivery line (not shown). The valve 14 is, therefore, operated in cumulative dependence upon the flow pressure of the liquid material in the outlet line and the hydrostatic pressure of the liquid material in the peeling chamber 1 transmitted onto piston 24.

Thus, it is seen that in a displacement of the liquid level in peeling chamber 1 radially inwardly, the liquid pressure in pressure chamber 13 is correspondingly increased, so that the cross sectional area of opening 16, is increased. On the other hand, where the liquid level is displaced radially outwardly, the liquid pressure in chamber 13 is decreased and accordingly opening 16 is decreased in cross sectional area. Spring 29 serves to softly and elastically transmit the fluctuating movements of auxiliary piston 24 on to piston 18. Thus, in a sense spring 25 and spring 19 both serve to move piston 18 to normally close the valve under a resultant counter-current pressure opposing the flow pressure of the liquid material in the outlet line while spring 20 in a sense exerts a counter pressure against spring 25 to absorb a portion of the tension thereof.

It is nevertheless possible to do without spring 29 and to rigidly connect spindle 23 directly with piston 18 instead. In this manner a combined spring action will be exerted upon piston 18, i.e., that of spring 25 and spring 19.

It is also possible to transform the liquid pressure prevailing in the line 12 into air pressure corresponding thereto in order to be able to control a pneumatic valve in the delivery or outlet line instead of a liquid pressure valve as shown in FIG. 2.

Thus, in accordance with the invention an apparatus is provided for achieving a liquid pressure flow communication between the liquid level in the peeling chamber within which the peeling disc is immersed and an adjustable pressure responsive valve means. By operatively coupling the liquid pressure with the valve means, the counter pressure of the valve means may be adjusted in dependence upon the liquid pressure in the peeling chamber so as to permit the opening of the valve to pass through a larger quantity of liquid material and a closing of the valve to avoid too large a flow through of the liquid material from the peeling chamber.

Thus, in accordance with the present invention, the continuous automatic foam-free delivery of liquid material from a centrifugal drum may be carried out by means of a peeling disc in a peeling chamber of the centrifuge wherein the centrifugal forces exerted upon the liquid occupying the peeling chamber during centrifuging may be sensed and the throttle opening of the valve in the delivery line accordingly adjusted in response to the forces sensed. In this manner, the liquid level occupying the peeling chamber may be varied in dependence upon the variations in the centrifugal hydrostatic force.

What is claimed is:

1. In a centrifuge having a rotatable bowl for treatment of liquid materials therewithin, a rotatable peeling chamber, a stationary peeling disc disposed within said peeling chamber, and at least one outlet peeling channel passing through said disc and flow connected with an outlet line for removing liquid material from said rotatable peeling chamber, the improvement which comprises an adjustable pressure responsive valve means in the outlet line for controlling the flow of liquid material removed from the peeling chamber, said valve means including a displaceable closure member movable in one direction to decrease the flow cross-section of the valve means and in the opposite direction to increase the flow cross-section of the valve means, closure member resilient means normally urging said closure member under a predetermined force in said one direction, pressure chamber means, pressure responsive working surface means disposed displaceably in said pressure chamber means for movement both in a forward direction and in a rearward direction, working surface resilient means normally urging said working surface means under a predetermined force in said forward direction, said working surface means being operatively connected with said closure member such that the force of said working surface resilient means urging said working surface means in said forward direction is combined with the force of said closure member resilient means urging said closure member in said one direction to produce a resultant closure member counter-pressure opposing the flow pressure of said liquid material in said outlet line acting on said closure member, and a liquid pressure communicating flow conduit in said peeling disc opening axially into said peeling chamber adjacent the periphery of the peeling disc and operatively connected with said pressure chamber means for transmitting the hydrostatic pressure of the radial level of the liquid material in the peeling chamber onto said working surface means against the force of the working surface resilient means to counteract correspondingly such force and in turn adjust the resultant closure member counter-pressure opposing the flow pressure of said liquid material in the outlet line and in turn adjust the flow cross-section of the valve means in cumulative dependence upon said flow pressure of the liquid material in the outlet line and said hydrostatic pressure of the liquid material in the peeling chamber transmitted onto said working surface means.

2. Improvement according to claim 1 wherein said working surface means and said valve member are positioned in tandem, coil spring means being provided for resiliently interconnecting said working surface means and said valve member for movement of said working surface means and said valve member in the same linear direction under the combined force of said closure member resilient means and said working surface resilent means.

3. In a centrifuge having a rotatable bowl for treatment of liquid materials therewithin, a rotatable peeling chamber, a stationary peeling disc disposed within said peeling chamber, and at least one outlet peeling channel passing through said disc and flow connected with an outlet line for removing liquid material from said rotatable peeling chamber, the improvement which comprises an adjustable pressure responsive throttle valve means in the outlet line for controlling the flow of liquid material removed from the peeling chamber, said valve means including a closure seat, a closure member movable longitudinally in a rearward direction from a position in closure contact with said closure seat to a position out of closure contact with said closure seat and in a forward direction from a position out of closure contact with said closure seat to a position in closure contact therewith, such that upon such movement in said forward direction said closure member decreases the flow cross-section of said opening until the closure contact position is reached and upon such movement in said rearward direction said closure member correspondingly increases the flow cross-section of said opening, closure spring means normally urging said closure member under a predetermined force in said forward direction toward the closure contact position, a separate cylinder chamber, a piston slidably received within said cylinder chamber and movable longitudinally back and forth therein and operatively connected with said closure member for corresponding movement therewith longitudinally in both said directions, piston spring means normally urging said piston under a predetermined force in said forward direction such that the force of said piston spring means is combined with the force of said closure spring means to produce a resultant valve means counter-pressure opposing the flow pressure of said liquid material in said outlet line acting on said closure member, and a liquid pressure communicating flow conduit in said peeling disc opening axially into said peeling chamber adjacent the periphery of said peeling disc and flow connected with said cylinder chamber in advance of said piston in the forward direction for transmitting the hydrostatic pressure of the radial level of the liquid material in the peeling chamber onto said piston against the force of said piston spring means to counteract correspondingly such force and in turn adjust the resultant valve means counter-pressure opposing the flow pressure of said liquid material in said outlet line to adjust the flow cross-section of the valve means in cumulative dependence upon said flow pressure of the liquid material in said outlet line and said hydrostatic pressure of the liquid material in the peeling chamber transmitted onto said piston, whereby upon displacement of such radial level radially inwardly a correspondingly increase in hydrostatic pressure of the liquid material is transmitted via said flow conduit onto said piston to cause a corresponding movement of said piston and in turn said closure member in said rearward direction to increase correspondingly the flow cross-section of the valve means and upon displacement of such radial level radially outwardly a corresponding decrease in hydrostatic pressure of the liquid material is transmitted via said flow conduit onto said piston to cause a corresponding movement of said piston and in turn said closure member in said forward direction to decrease correspondingly the flow cross-section of the valve means.

References Cited in the file of this patent
UNITED STATES PATENTS

| | | |
|---|---|---|
| 2,145,544 | Hapgood | Jan. 31, 1939 |
| 2,177,082 | Staaff | Oct. 24, 1939 |
| 2,622,796 | Steinacker et al. | Dec. 23, 1952 |
| 2,736,337 | Parks et al. | Feb. 28, 1956 |
| 3,052,401 | Thylefors | Sept. 4, 1962 |
| 3,079,070 | Thylefors | Feb. 26, 1963 |